United States Patent
Fieber

(12) 
(10) Patent No.: US 6,568,716 B1
(45) Date of Patent: May 27, 2003

(54) SECURING COUPLING FOR CORRUGATED PIPES

(75) Inventor: Dieter Fieber, Hainburg (DE)

(73) Assignee: Flexa GmbH & Co. KG, Hanau/Main (DE)

(*) Notice: Subject to any disclaimer, the term of this patent is extended or adjusted under 35 U.S.C. 154(b) by 5 days.

(21) Appl. No.: 09/807,937
(22) PCT Filed: Aug. 17, 2000
(86) PCT No.: PCT/EP00/08045
§ 371 (c)(1), (2), (4) Date: Apr. 20, 2001
(87) PCT Pub. No.: WO01/14780
PCT Pub. Date: Mar. 1, 2001

(30) Foreign Application Priority Data

| Aug. 21, 1999 | (DE) | 199 39 149 |
| Aug. 21, 1999 | (DE) | 299 14 435 U |
| Sep. 24, 1999 | (DE) | 199 45 751 |
| Sep. 24, 1999 | (DE) | 299 16 743 U |

(51) Int. Cl.⁷ ............................................. F16L 25/00
(52) U.S. Cl. .......................... 285/305; 285/319; 285/39
(58) Field of Search ................... 285/903, 319, 285/305, 39

(56) References Cited

U.S. PATENT DOCUMENTS

| 3,250,551 A | * 5/1966 | Draudt | 285/7 |
| 4,441,745 A | 4/1984 | Nicholas | |
| 4,749,214 A | * 6/1988 | Hoskins et al. | 285/4 |
| 5,087,084 A | 2/1992 | Gehring | |
| 5,354,106 A | 10/1994 | Washizu et al. | |

FOREIGN PATENT DOCUMENTS

| DE | 94 00 905 | 5/1994 | |
| DE | 39 03 353 | 8/1996 | |
| DE | 296 13 054 | 11/1996 | |
| EP | 0 414 500 | 2/1991 | |
| FR | 26298 93 | * 10/1989 | 285/903 |
| WO | 98/40656 | 9/1998 | |

* cited by examiner

Primary Examiner—Anthony Knight
Assistant Examiner—G M Collins
(74) Attorney, Agent, or Firm—Cohen, Pontani, Lieberman & Pavane

(57) ABSTRACT

The coupling includes a tubular sleeve having a circumferential wall and an open end for receiving the corrugated pipe, the tubular sleeve having a sleeve section which is pivotable radially outward from the sleeve by means of an integral hinge connecting the sleeve section to the circumferential wall. A first locking tongue is arranged in a first aperture in the circumferential wall, the first aperture being located in the sleeve section. The first locking tongue is resiliently connected to the sleeve section and has a first blocking projection which is engageable with a circumferential groove in the pipe, the first locking tongue being movable radially outward with resilience to release the blocking projection from the groove. A second locking tongue is arranged in a second aperture in the circumferential wall, the second aperture being located opposite from the first aperture. The second locking tongue is resiliently connected to the sleeve and has a second blocking projection which is engageable with the circumferential groove in the pipe, the second locking tongue having a lever arm which extends toward the open end of the sleeve. The lever arm is movable radially inward to move the second locking tongue radially outward with resilience to release the second blocking projection from the groove.

14 Claims, 8 Drawing Sheets

SECURING COUPLING FOR CORRUGATED PIPES

PRIORITY CLAIM

This is a U.S. national stage of application of PCT/EP00/08045, filed on Aug. 17, 2000. Priority is claimed on that application and on the following applications: Country: Germany, Application No: 299 14 435.6, filed Aug. 21, 1999; Country: Germany, Application No: 199 39 149.1, filed Aug. 21, 1999; Country: Germany, Application No: 299 16 743.7, filed Sep. 24, 1999; Country: Germany, Application No. 199 45 751.4, filed Sep. 24, 1999.

BACKGROUND OF THE INVENTION

1. Field of the Invention

The invention concerns securing couplings for corrugated pipes.

Various types of securing couplings for corrugated pipes have been known for many years. Numerous types indicate spring-loaded locking elements with elastic fingers which are provided with projections which again engage in a wave trough of a corrugated pipe in order to establish and accomplish a position-fixation of the pipe. The fingers of such couplings suffer an elastic deflection when the pipe is pushed into and removed from its position.

2. Description of the Related Art

DE 39 03 353 discloses a connecting fitting for circumferentially flanged pipes or hoses, particularly for flexible corrugated hoses with corrugations or the like which are transverse to the hose axis and run around the circumference. The connecting fitting has a sleeve to accommodate the end of the corrugated hose, and in the wall of this sleeve there is a single tongue, which is deflectable against a restoring force of a resilient region. This tongue extends in the axial direction of the sleeve and has a projection directed into the interior of the sleeve for the purpose of engaging a corrugation or the like of the corrugated hose or corrugated pipe to fix its axial position. The region of the tongue exhibiting the projection has a large dimension in the circumferential direction and the length of the projection in the circumferential direction of the sleeve is at least approximately equal to the internal radius of the sleeve.

In DE 296 13 054 U1, a pipe connector made of plastic is disclosed, consisting of a sleeve-shaped body designed to accommodate a rigid or flexible pipe (hose). The jacket of this body contains at least one formed tongue, which is formed by a somewhat U-shaped recess and has spring-supported movement around its base. The tongue has at its free end a blocking element for engaging in a recess or for a rear grip of a flange of a pipe pressed forward into position, and the tongue and the blocking element are oriented at a right angle to the sleeve axis.

EP 0414500 discloses a coupling wherein a finger is connected with the tubular body of the coupling by way of lateral mounting elements which ensure that the finger has flexible or resilient displacement because of elastic torsional straining of the elements around a transverse axis.

The disadvantage with all these couplings is the fact that the locking elements or fingers, respectively, are either too weak in order to keep the corrugated conduit in position against a strong withdrawing force, or they are strong enough to hold the corrugated conduit but are too stiff to allow the conduit to be pressed conveniently into the coupling. In addition, there is a possibility of allowing, without a tool, an unforeseeable release of the corrugated pipe either by means of unintentional and/or intentional misuse swivelling of a corresponding finger. This is a significant disadvantage especially in safety-relevant areas and applications.

From the statements made above, the problem subsequently results that, with the help of newly designed securing couplings for corrugated pipes, the above-mentioned disadvantages are to be at least partially eliminated. The resulting problem is, in particular, to provide securing couplings for corrugated pipes which—especially only with the help of a tool—allow in an uncomplicated manner the possible release of a previously fixed-positioned corrugated pipe and which prevent the corrugated pipe from slipping out of position unintentionally.

SUMMARY OF THE INVENTION

The securing coupling according to the invention includes a tubular sleeve with an open lead-in end for receiving a corrugated pipe, at least a first locking tongue which is movably arranged in a first aperture in the circumferential wall of the sleeve, and at least one blocking projection for the engagement into a circumferential groove of the corrugated pipe. The locking tongue, with reference to the sleeve, is connected by means of at least one securing element at the sleeve, radially movable with a spring effect, so that the blocking projection can be disengaged from the groove of the corrugated pipe.

The locking tongue is preferably arranged in a sleeve section which is pivotable radially outward from the peripheral wall of the tubular sleeve by means of an integral hinge.

By means of the integral hinge and with a corresponding design and construction of the sleeve section and the part of the tubular element of the securing coupling accommodating the open end of the sleeve section, an uncomplicated opening is possible only with the help of a tool. The blocking projection of the tongue on the sleeve section is thus disengaged from the groove of the corrugated pipe.

The securing coupling preferably also includes at least one second locking tongue, movably arranged in a second aperture in the peripheral wall of the sleeve, opposite the first locking tongue, where the second locking tongue with reference to the sleeve is joined by way of at least one securing element not designed as an integral hinge. In this way, and with the opening of a sleeve section, an unintentional or accidental slipping-out of the corrugated pipe is practically avoided because at least the second locking tongue engages in the peripheral groove of the corrugated pipe. With the design of the connection or joining of the second locking tongue as an integral hinge, a release of a corrugated pipe would only be possible by way of an unlocking with an auxiliary tool where, with a previous unlocking, an unintentional slipping-out would be possible upon loosening/disengagement of the (first) integral hinge. In order to avoid this, the second joining/connection of the second locking tongue is not to be designed as an integral hinge.

The tubular sleeve includes a bearing ring at the open lead-in end, at least in the zone of the sleeve section, as a corrugated pipe is fixedly positioned in the securing coupling, and the stability of the joining/connection of the sleeve section to the sleeve established by way of the integral hinge is increased.

Furthermore, the bearing ring is oval shaped because a very good fixation of a corrugated pipe is possible and, beyond this, the loosening/disengagement of the corrugated pipe—with the sleeve section opened—is only possible with the help of a tool at radial displacement of the second locking tongue into a release position outside of engagement in a groove of the corrugated pipe. Therefore, an unintentional falling-out of the corrugated pipe is practically ruled out.

With this design arrangement, and by means of a light reciprocating movement of the previously fixed-positioned hose and/or by minor radial deformation of the sleeve, the corrugated pipe can be released and, consequently, drawn out of the securing coupling. This represents—after opening the sleeve section—a particularly uncomplicated release of the corrugated pipe from the securing coupling.

The second locking tongue includes a lever arm protruding over the securing element in the axial direction over the open lead-in end. By pivoting the lever arm in the direction of the sleeve axis, and subsequently a relatively convenient release of the secured corrugated pipe with the integral hinge opened—is possible by means of a radial pivoting of the second locking tongue to a release position outside of engagement.

The second securing coupling includes a tubular sleeve with an open lead-in end for accommodating the corrugated pipe, where the sleeve carries at least one blocking projection for the engagement into a peripheral grove of the corrugated pipe. The blocking projection is arranged in a radially outward pivoting sleeve section from the peripheral wall of the tubular sleeve by means of an integral hinge.

By means of the integral hinge and with a corresponding design and construction of the sleeve section and the part of the tubular element of the securing coupling accommodating the open end of the sleeve section, an uncomplicated opening is possible only with the help of a tool. The blocking projection of the sleeve section is disengaged from the groove of the corrugated pipe.

The securing coupling preferably includes at least one locking tongue, movably arranged in a recess in the peripheral wall of the sleeve, opposite the blocking projection, where the locking tongue with reference to the sleeve is joined by way of at least one securing element not designed as an integral hinge. In this way, and when opening the sleeve section, an unintentional/accidental slipping-out of the corrugated pipe is practically avoided because at least the locking tongue engages in the peripheral groove of the corrugated pipe. With the design of the joining/connection of the locking tongue as an integral hinge, a release of the corrugated pipe would only be possible by way of an unlocking with an auxiliary tool where, with a previous unlocking, an unintentional slipping-out would be possible upon loosening/disengagement of the (first) integral hinge. In order to avoid this, the second joining/connection of the second locking tongue is not to be designed as an integral hinge.

The tubular sleeve includes a bearing ring at the open lead-in end, at least in the zone of the sleeve section, as a corrugated pipe is fixedly positioned in the securing coupling, and the stability of the joining/connection of the sleeve section to the sleeve established by way of the integral hinge is increased.

Furthermore, the bearing ring is oval shaped because a very good fixation of a corrugated pipe is possible and, beyond this, the loosening/disengagement of the corrugated pipe—with the sleeve section opened—is only possible with the help of a tool at radial displacement of the second locking tongue into a release position outside of engagement in a groove of the corrugated pipe. Therefore, an unintentional falling-out of the corrugated pipe is practically ruled out.

The second locking tongue includes a lever arm protruding over the securing element in the axial direction over the open lead-in end. By pivoting the lever arm in the direction of the sleeve axis, a relatively convenient release of the secured corrugated pipe—with the integral hinge opened—is possible by means of a radial pivoting of the second locking tongue to a release position outside of engagement.

The third securing coupling includes a tubular sleeve with an open lead-in end for accommodating the corrugated pipe, where the sleeve carries at least one blocking projection for the engagement into a peripheral grove of the corrugated pipe. The blocking projection is arranged in a radially outward pivoting sleeve section from the peripheral wall of the tubular sleeve by means of an integral hinge.

The blocking projection is part of a locking unit arranged between two apertures, in particular slot-shaped apertures, and by way of two securing elements, for example wide material connecting, joined at the forward-tilting sleeve section. The locking unit's external and/or internal partial tubular jacket profile has an attenuation at least in the longitudinal direction of the sleeve section.

Based on this material attenuation, and despite the bilateral joining to the sleeve section, a good radial pivoting capability with a simultaneous high strength level of the locking unit is established.

The securing coupling includes at least one locking tongue, movably arranged in an aperture in the peripheral wall of the sleeve, opposite the blocking projection, where the locking tongue with reference to the sleeve is joined by way of at least one securing element not designed as an integral hinge. In this way, and with the opening of a sleeve section, an unintentional or accidental slipping-out of the corrugated pipe is practically avoided because at least the locking tongue engages in the peripheral groove of the corrugated pipe. With the design of the connection or joining of the locking tongue as an integral hinge, a release of a corrugated pipe would only be possible by way of an unlocking with an auxiliary tool where, with a previous unlocking, an unintentional slipping-out would be possible upon loosening/disengagement of the (first) integral hinge. In order to avoid this, the second joining/connection of the second locking tongue is not to be designed as an integral hinge.

The tubular sleeve includes a bearing ring at the open lead-in end, at least in the zone of the sleeve section, as a corrugated pipe is fixedly positioned in the securing coupling, and the stability of the joining/connection of the sleeve section to the sleeve established by way of the integral hinge is increased.

Furthermore, the bearing ring is oval shaped as a very good fixation of a corrugated pipe is possible and, beyond this, the loosening/disengagement of the corrugated pipe—with the sleeve section opened—is only possible with the help of a tool at radial displacement of the second locking tongue into a release position outside of engagement in a groove of the corrugated pipe. Therefore, an unintentional falling-out of the corrugated pipe is practically ruled out.

With this design arrangement, and by means of a light reciprocating movement of the previously fixedly positioned hose and/or by minor radial deformation of the sleeve, the corrugated pipe can be released and, consequently, drawn out of the securing coupling. This represents—after opening the sleeve section—a particularly uncomplicated possibility of separating the corrugated pipe from the securing coupling.

The second locking tongue includes a lever arm protruding over the securing element in the axial direction over the open lead-in end. By pivoting the lever arm in the direction of the sleeve axis, a relatively convenient release of the secured corrugated pipe—with the integral hinge opened—is possible by means of a radial pivoting of the second locking tongue to a release position outside of engagement.

Where the third securing coupling is concerned, it is advantageous if at least one securing element includes at least one further aperture, for example a further slot in the longitudinal direction of the sleeve section, because the flexibility of the locking unit is increased in this way.

Where the first securing coupling is concerned, it is advantageous if the locking tongue is conically-tapered in the direction away from the blocking projection, and/or the second locking tongue is conically-tapered in the direction away from the blocking projection, because in this way a higher degree of pivoting and, subsequently, a more convenient dismantling is possible.

Where the second securing coupling is concerned, it is advantageous if the locking tongue is conically-tapered in the direction away from the blocking projection, because in this way a higher degree of swivelling and, subsequently, a more convenient dismantling is possible.

Where the securing coupling is concerned, the sleeve advantageously includes a slot-shaped recess, designed as a hollow profile, for receiving a free end of the sleeve section because this design arrangement involves a possibility of a locking capability of the sleeve section in the sleeve which is relatively easy to realise and is favourable with regard to the costs.

In this connection it is advantageous if the slot-shaped recess includes an abutting surface forming a first projection in the hollow profile of the recess and the free end of the sleeve section includes a corresponding abutting surface with a second projection for a rear grasping of the first projection during the locking-in action of the sleeve section in the sleeve.

It is emphasised that the back-up ring can also have a circular-shaped design.

The fourth securing coupling for corrugated pipes includes a tubular sleeve with an open lead-in end for accommodating the corrugated pipe as well as at least a first locking tongue which is movably arranged in a first aperture in the peripheral wall of the sleeve, where the sleeve carries at least one blocking projection for the engagement into a peripheral groove of the corrugated pipe. The locking tongue, with reference to the sleeve, is connected by means of at least one securing element at the sleeve, radially movable with resilience so that the blocking projection can be brought into a release position outside of engagement with the groove of the corrugated pipe.

The securing coupling includes at least one further locking tongue, radially and movably arranged in a further aperture recess in the peripheral wall of the sleeve where this, with reference to the sleeve, is joined by at least one further securing element. All securing elements are ligament-shaped in design, whereas all locking tongues in the direction away from the blocking projections are conically-tapered in design.

Where the fourth securing coupling is concerned, it is advantageous when this includes at least three, especially four locking tongues because a relatively high engagement redundancy is ensured in this way. In the event of a failure of any one single locking tongue, the remaining locking tongues, as a rule, always engage and prevent an uncontrolled release.

When at least one locking tongue includes an oval-shaped aperture, this represents material saving and, subsequently, cost savings when manufacturing the securing coupling.

It is an advantage for the securing coupling if at least one locking tongue is connected with the sleeve by at least one connecting element which is arch shaped in the resting position, in the radial direction and limited in pivoting movement. An excessively wide pivoting at excessively strong material stressing is thereby avoided.

The securing coupling kit according to the invention, consists of a securing coupling in accordance with the fourth variant and a dismantling tool, where the dismantling tool during dismantling grasps around the hose and is slidable in the longitudinal axis direction between the corrugated pipe and the securing coupling. The tool includes two semi-shells which can be assembled with one another, or includes two semi-shells which can pivot together by means of at least one connecting element similar to a hinge.

During dismantling, the locking tongues are brought out of engagement by pushing the tool between the corrugated pipe and the securing coupling so that the corrugated pipe can be drawn out of the securing coupling.

Moreover, it is also advantageous if at least one semi-shell includes at least one tongue having a radial pivoting movement because, after the embracing of the corrugated pipe with the dismantling tool and pushing it in between corrugated pipe and securing coupling, the tongue can be brought into engagement, preferentially by means of a switch surface placed on the outer surface of a semi-shell, with the corrugated pipe and so that the corrugated pipe can be drawn out of the securing coupling. This method of dismantling is particularly advantageous with very soft hoses as the mechanical loading on these is particularly low.

The securing coupling according to the invention, as well as the dismantling tool can consist of various material types and material compositions, for example polyethylene, polyimide etc. and beyond this, can be designed in accordance with the specific assembly requirements in various forms with regard to the sleeve, for example in the form of angular pieces, straight pieces with or without flanges etc.

DETAILED DESCRIPTION OF THE PREFERRED EMBODIMENTS

Figure 1:
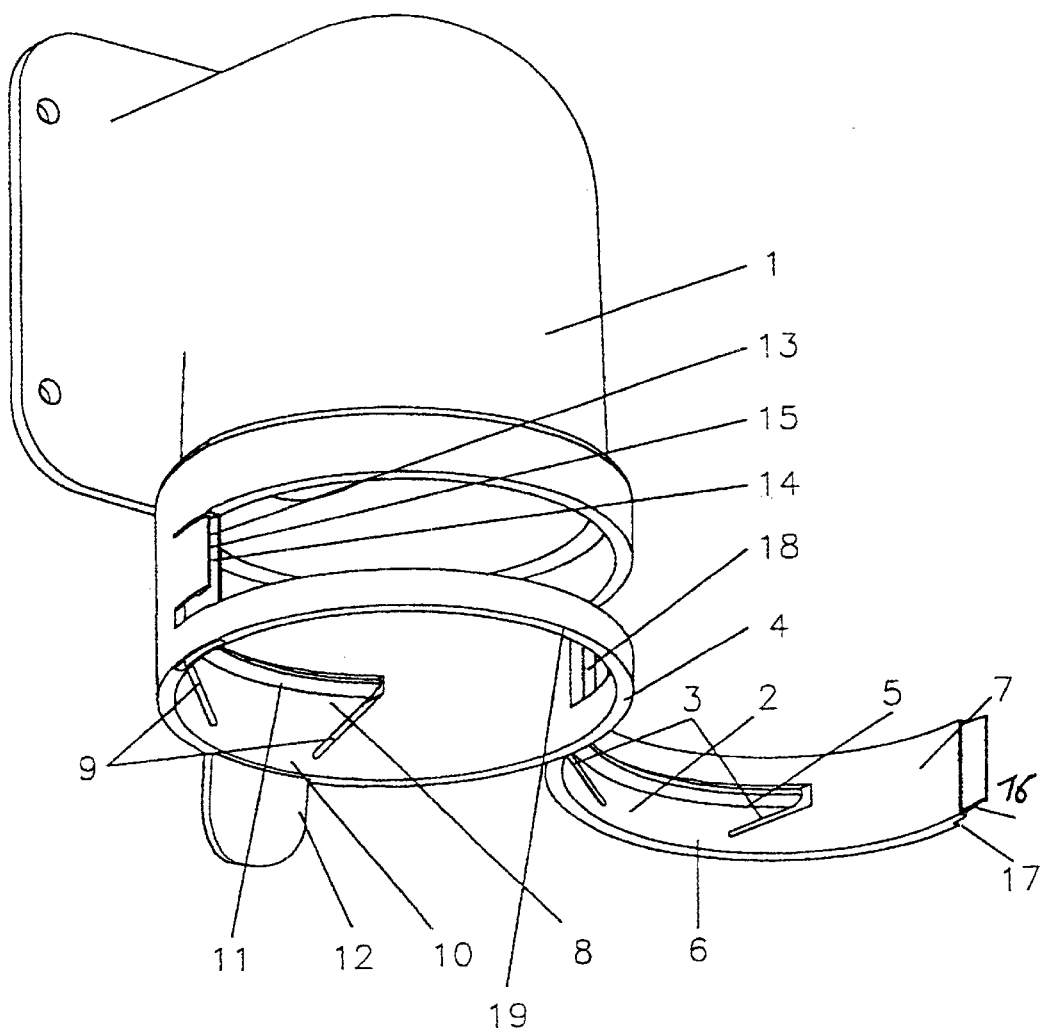
FIG. 1 is a perspective illustration of a first embodiment of the securing coupling according to the invention.

The securing coupling shown in FIG. 1 includes an angular and tubular sleeve 1 which has an open lead-in end for accommodating a corrugated pipe. In addition, there is a first locking tongue 2 which is movably arranged in a first aperture 3—at closed condition of the sleeve section 7—in the peripheral wall 4 of the sleeve 1. The sleeve section 7 is joined/hinged to the sleeve 1 by means of an integral hinge 18. The locking tongue 2 includes a blocking projection 5 for the engagement into a peripheral groove of a corrugated pipe. The locking tongue 2, with reference to the sleeve 1, is connected by means of one securing element 6, here in the form of a material connection, at the sleeve 1, radially movable with a spring effect, so that the blocking projection 5 can be brought into a release position outside of engagement with the groove of a corresponding corrugated pipe. The locking tongue 2 is arranged in a radially forward-tilting sleeve section 7 from the peripheral wall 4 of the tubular sleeve 1 by means of an integral hinge 18.

In addition, the securing coupling includes a second locking tongue 8, movably arranged in a second aperture 9 in the peripheral wall 4 of the sleeve 1, opposite the first locking tongue 2, where the second locking tongue 8, with reference to the sleeve 1, is joined by way of a securing element 10, here in the form of a material connection.

The tubular sleeve 1 includes a circular-shaped bearing ring 19 at the open lead-in end.

Figure 4:
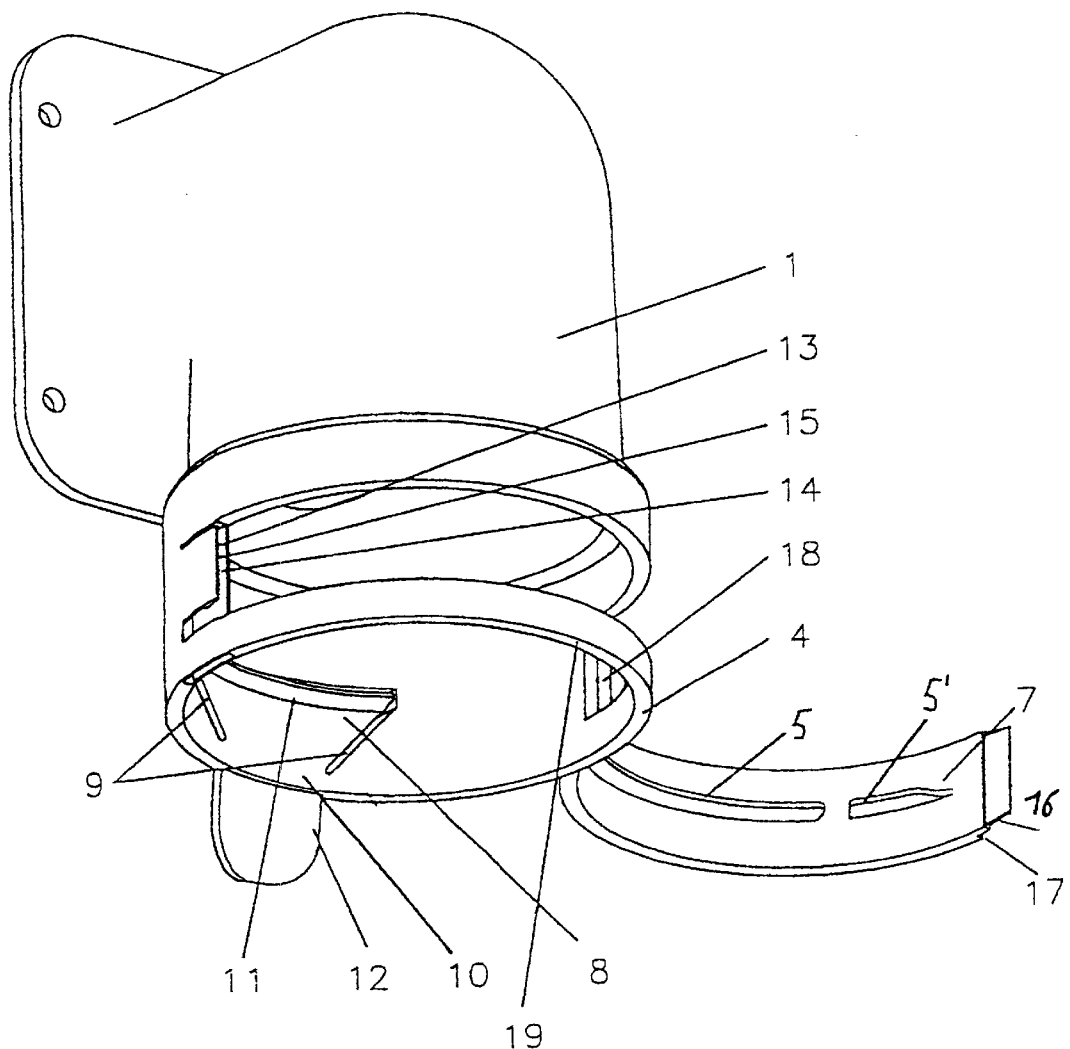
FIG. 4 is a perspective illustration of a second embodiment of the securing coupling according to the invention.

The securing coupling shown in FIG. 4 includes an angular and tubular sleeve 1 which has an open lead-in end for accommodating a corrugated pipe. In addition, there are three (one is not visible) blocking projections 5, 5' which— with the closed condition of a sleeve section 7—are rigidly arranged in the peripheral wall 4 of the sleeve 1.

The sleeve section 7 is joined to the sleeve 1 by means of an integral hinge 18. The blocking projections 5,5' are arranged radially and forward-tilting in sleeve section 7, from the peripheral wall 4 of the tubular sleeve 1 by means of an integral hinge 18. In addition, the securing coupling includes a locking tongue 8, opposite the -blocking projections 5,5', movably arranged in a recess 9 in the peripheral wall 4 of the sleeve 1, where the locking tongue 8, with reference to the sleeve 1, is joined by means of a securing element 10, here in the form of a material connection. The tubular sleeve 1 includes a circular-shaped bearing ring 19 at the open lead-in end.

These features in the following description of the invention-related first securing coupling are clearly recognisable in the FIGS. 2 and 3, whereas for the second securing.

Figure 2:
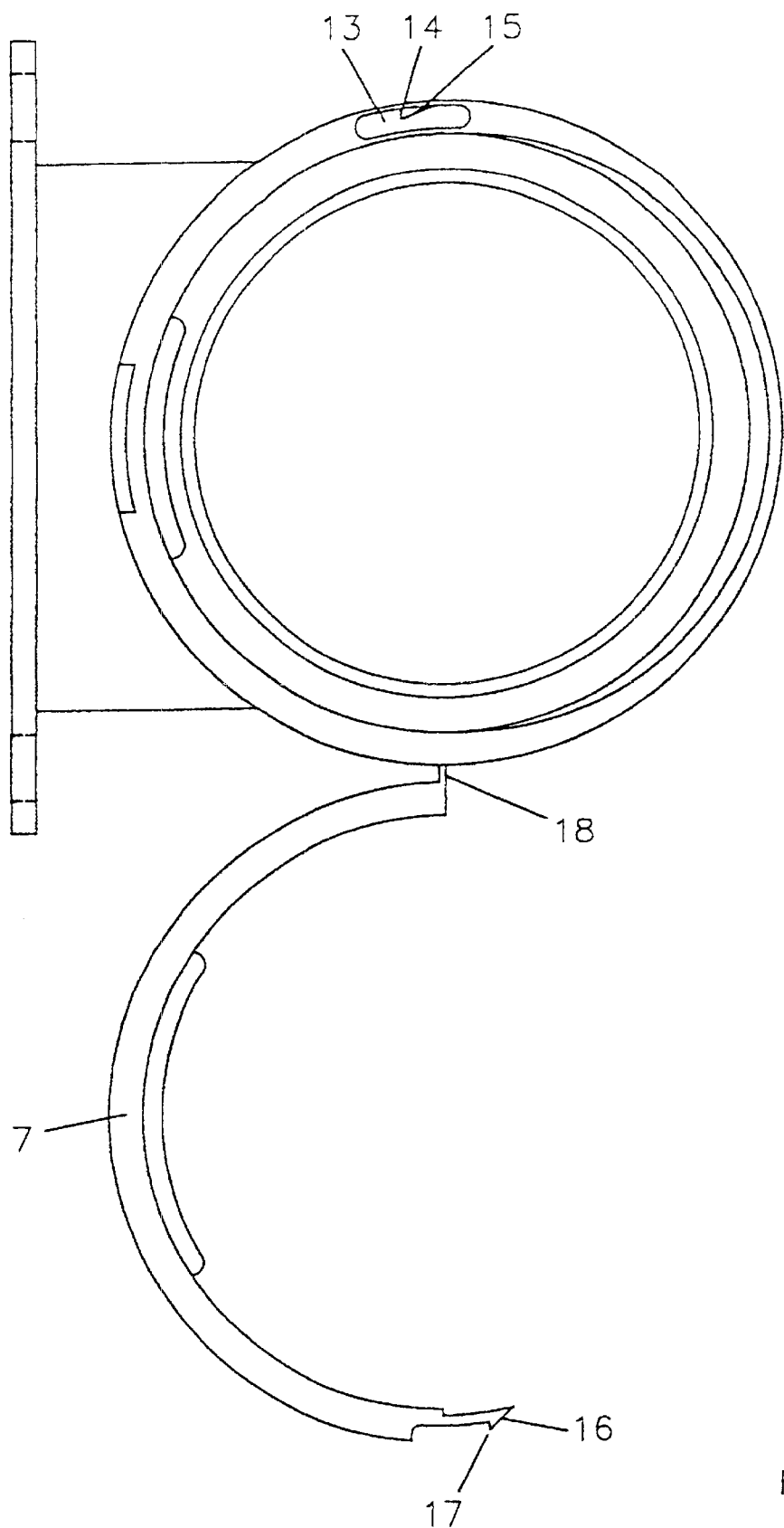
FIG. 2 is a transverse view of the securing coupling shown in FIG. 1 with the opened sleeve section.

The slot-shaped recess 13 includes an abutting surface 15 forming a first projection 14 in the hollow profile of the recess 13 and the free end of the sleeve section 7 includes a corresponding abutting surface 16 with a second projection 17 to establish a rear grasp of the first projection 14 when the sleeve section 7 locks into the sleeve 1 (see FIG. 2).

Figure 3:
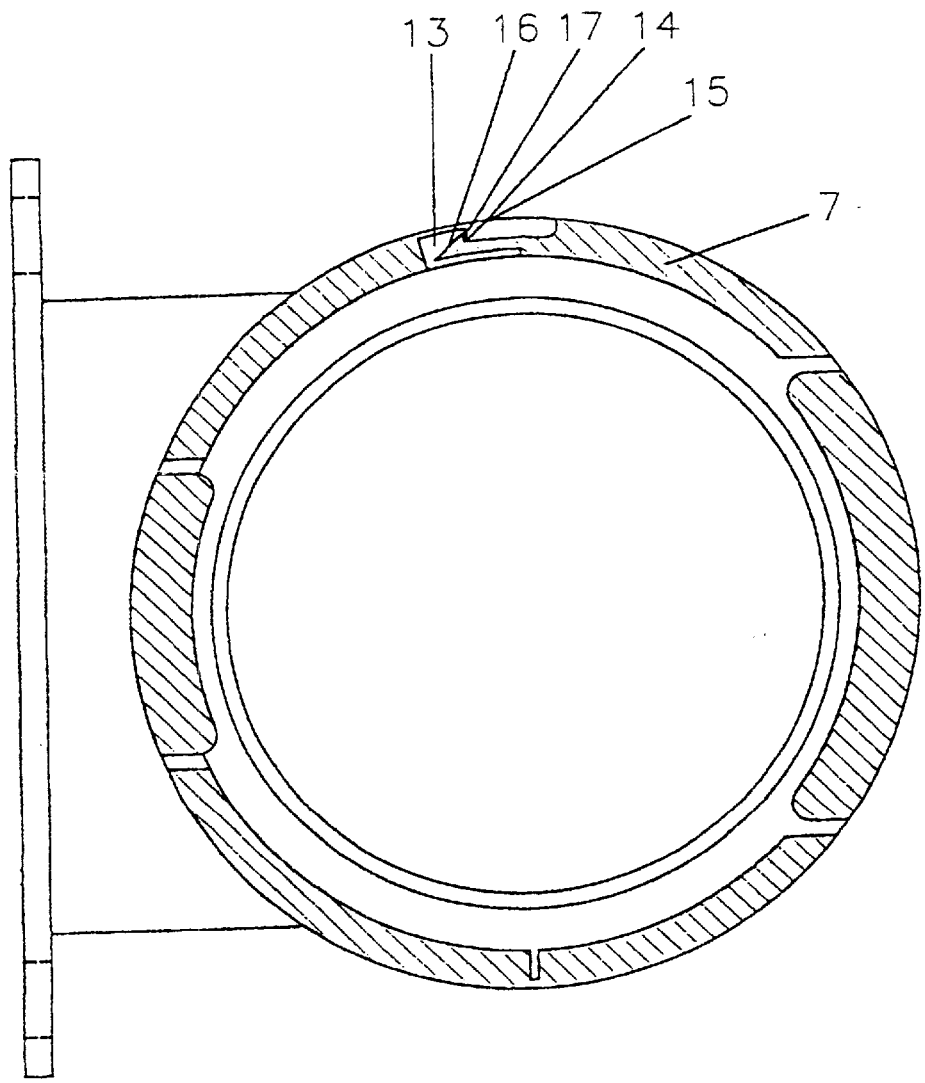
FIG. 3 is a transverse view of the securing coupling shown in FIG. 1 with the closed sleeve section.

In FIG. 3 it can be finally seen that, in the closed condition of sleeve section 7, the second projection 17 has a rear grasp on the first projection 14 and thus accomplishing a locking status. This locking status can only be loosened by means of a pin, inserted into the recess 13 so that a relative movement of the two projections 14, 17 away from one another takes place, and at the same time the sleeve section 7 is tilted out radially from the peripheral wall 4 of the tubular sleeve 1. In this position, the corresponding corrugated pipe is held only by the blocking projection 11 of the second locking tongue 8. By activating the lever arm 12, the corrugated pipe is finally released.

Figure 5:
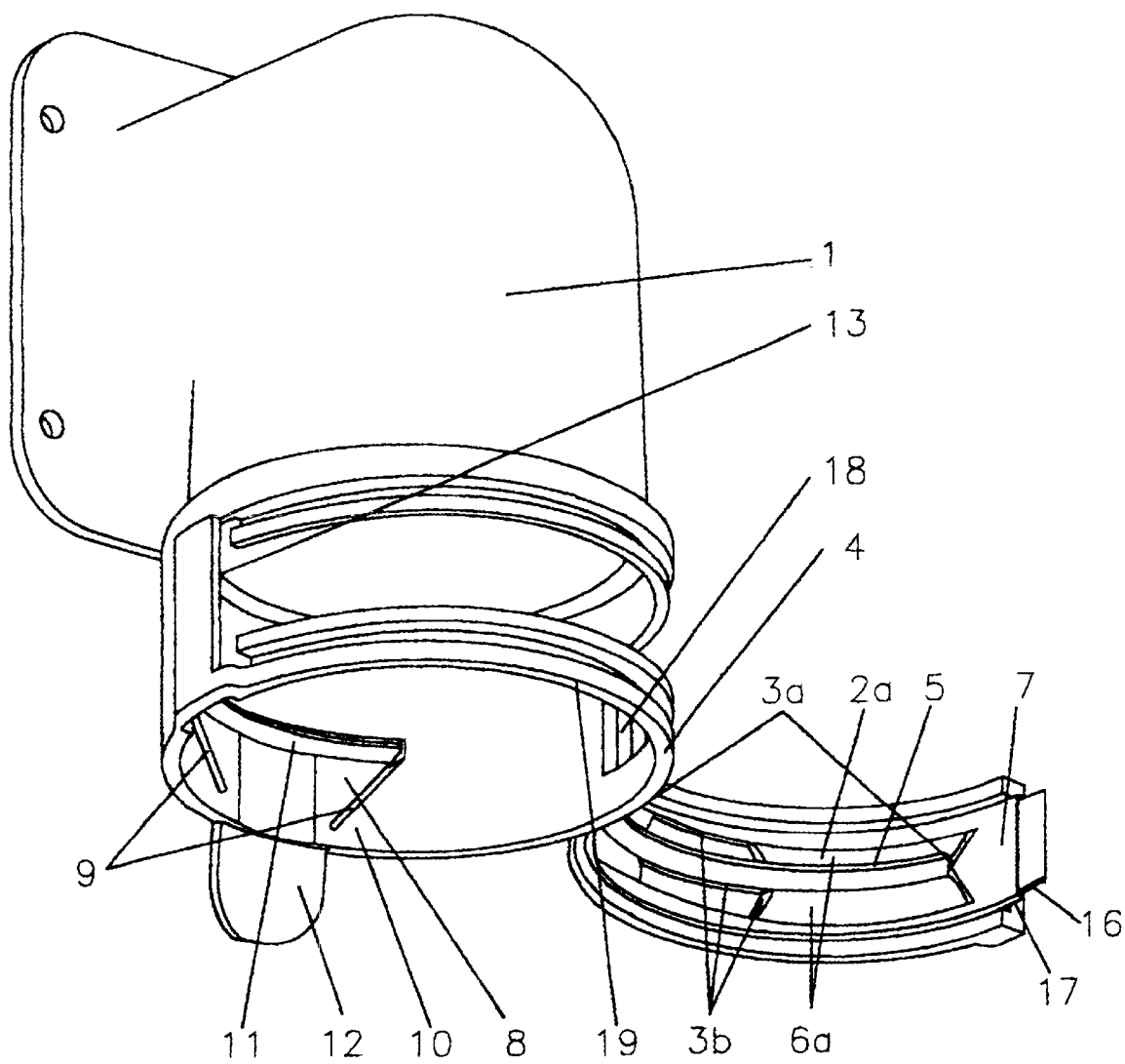
FIG. 5 is a perspective illustration of a third embodiment of the securing coupling according to the invention.

The securing coupling shown in FIG. 5 includes an angular and tubular sleeve 1 which has an open lead-in end for accommodating a corrugated pipe. In addition, there is one blocking projection 5, which with the closed condition of a sleeve section 7—is rigidly arranged in the peripheral wall 4 of the sleeve 1. The sleeve section 7 is joined/hinged to the sleeve 1 by means of an integral hinge 18. The blocking projection 5, is arranged radially and forward-tilting in sleeve section 7, from the peripheral wall 4 of the tubular sleeve 1 by means of an integral hinge 18. The blocking projection 5 is part of a locking unit 2a, arranged between two apertures 3a and joined by way of two securing elements 6a in the form of wide material connections at the forward-tilting sleeve section 7. The locking unit's external part tubular jacket profile 20 includes an attenuation (not visible) in the longitudinal direction of the sleeve section 7. Both material connections are attenuated by means of further slot-shaped apertures 3b.

The securing coupling includes a locking tongue 8, movably arranged in an aperture 9 in the peripheral wall 4 of the sleeve 1, opposite blocking projection 5, where the locking tongue 8 with reference to the sleeve 1 is joined by means of a securing element 10, here in the form of a material connection.

The tubular sleeve I indicates a circular-shaped bearing ring 19 at the open lead-in end.

The release position of the blocking projection 11 is facilitated by the fact that the locking tongue 8 has a lever arm 12 protruding over the securing element 10 in the axial direction over the open lead-in end.

Furthermore, the sleeve 1 has a slot-shaped recess 13, designed as a hollow profile, for accommodating the sleeve section 7.

Figure 6:
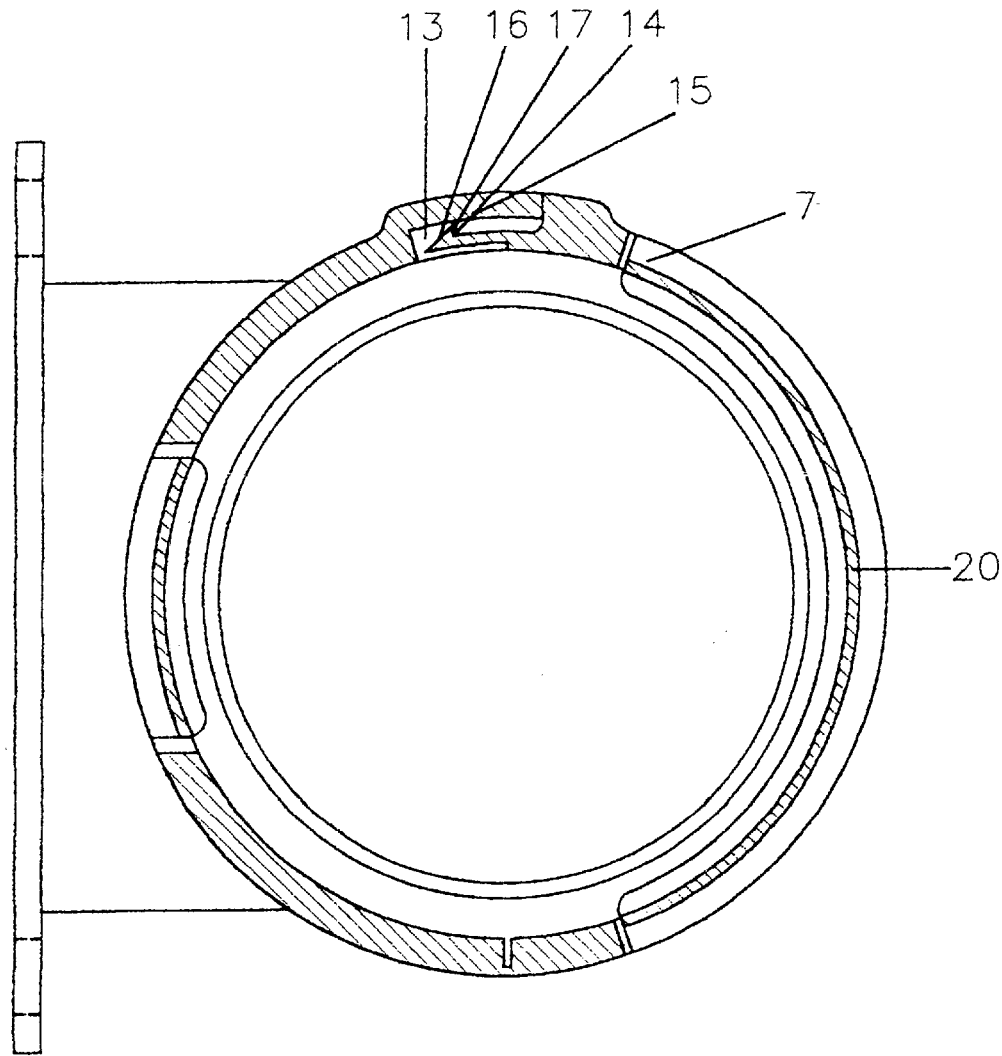
FIG. 6 is a cross-sectional view of the securing coupling shown in FIG. 5 with the closed sleeve section.

In FIG. 6, by comparison with FIG. 3, the part tubular (here: running over the length of the sleeve section 7) jacket profile 20 of the locking unit 2a can be seen. In the cross-sectional view, this is seen as relatively thin, and the reason for this is that the corresponding material attenuation runs over the entire length.

Figure 7:
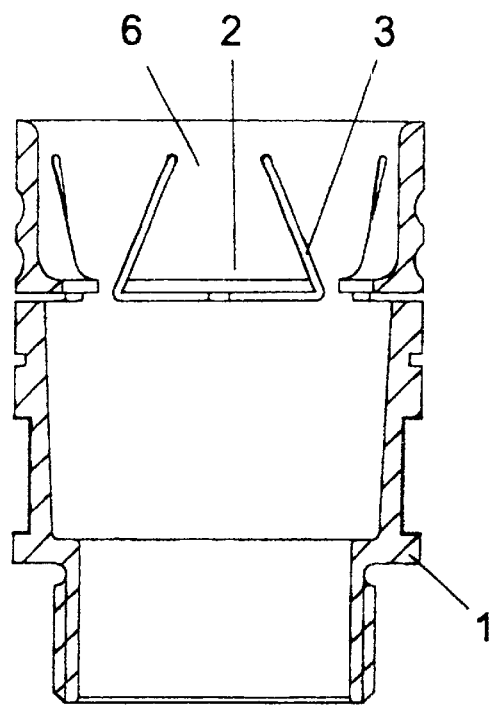
FIG. 7 is a longitudinal view of a fourth embodiment of the securing coupling according to the invention.
Figure 8:
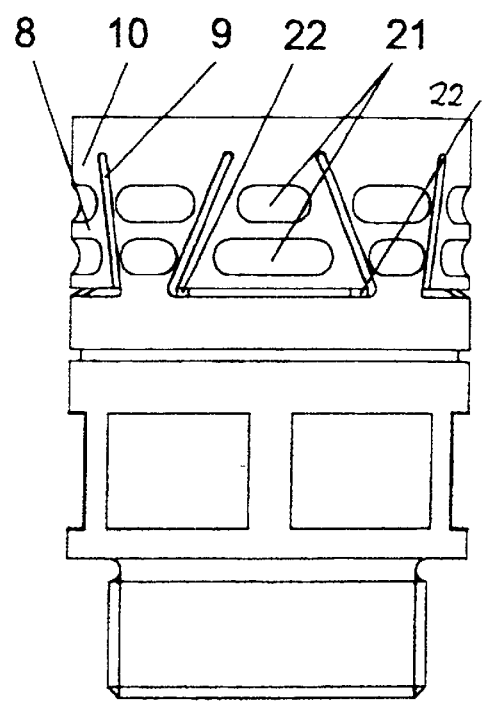
FIG. 8 is a longitudinal view of a fourth embodiment of the securing coupling.
Figure 9:
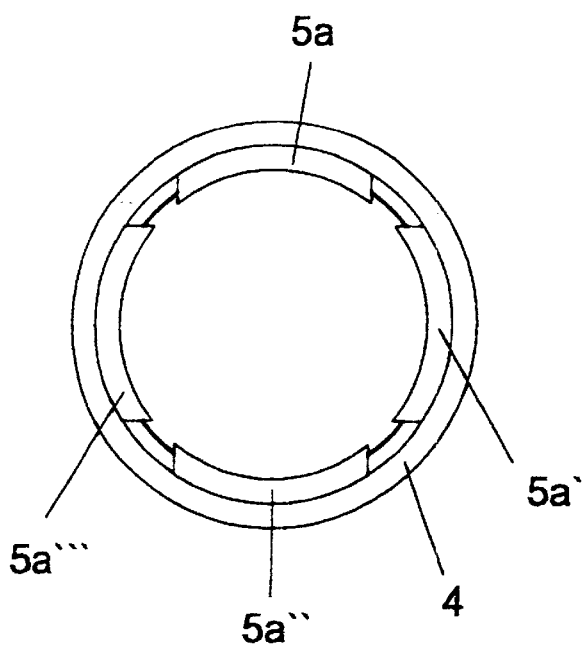
FIG. 9 is a radial transverse view of the securing coupling illustrated in FIG. 7.

In FIGS. 7 and 8 the locking tongues 2,B are joined with sleeve 1 by securing elements 6, 10 in apertures 3,9, designed as a connection in each case, radially and with resilience. In the design as shown in FIG. 8, the locking tongues 2 include, in each case, two oval apertures 21. In FIG. 9 there are four blocking projections 5a, 5a', 5a", 5a''', in the radial transverse view for the engagement into a peripheral groove (corrugate trough) of the corrugated pipe. In FIG. 8 arch shaped connecting elements 22 can be seen in rest position, designed for preventing excessive radial pivoting.

Figure 11:
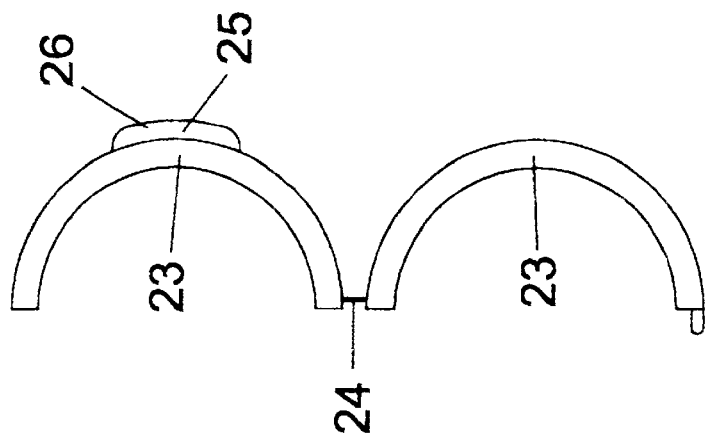
FIG. 11 is an axial view of the dismantling tool illustrated in FIG. 10.
Figure 10:
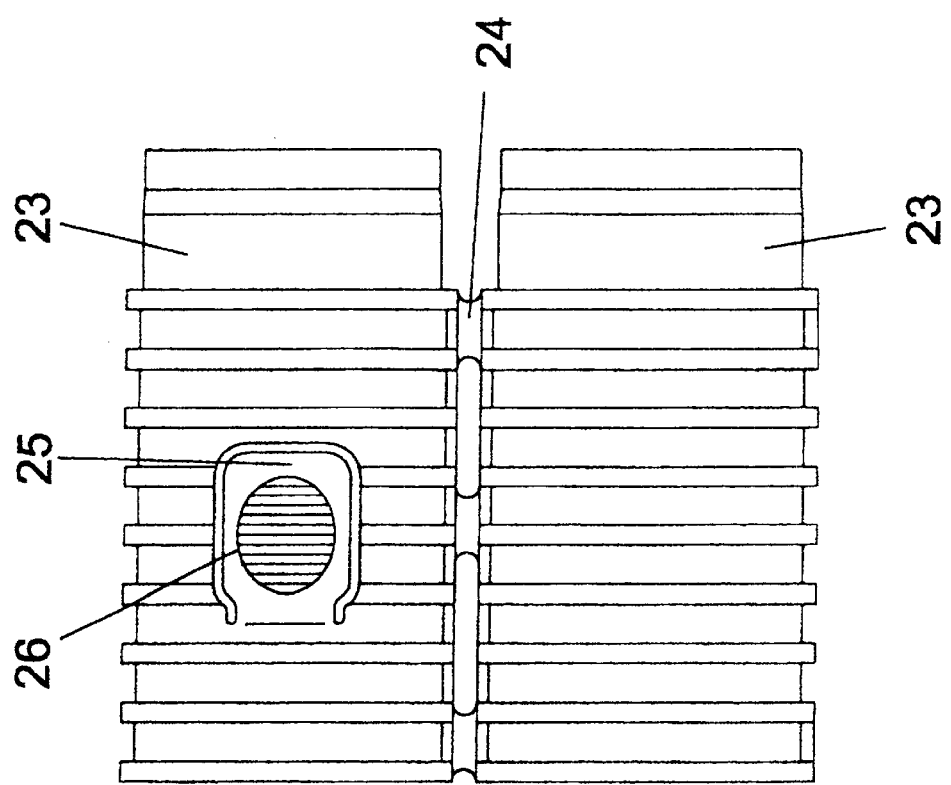
FIG. 10 is a longitudinal view of a dismantling tool.

In FIG. 10 a longitudinal view and in FIG. 11 an end view of a development of a dismantling tool are shown. The dismantling tool comprises two semi-shells 23, joined together by means of three hinge-like connecting elements 24, where one semi-shell 23 includes a resilient tongue 25 which is brought into engagement with a corrugate trough of a corrugated pipe by means of switch surface 26 placed on the outer surface of a semi-shell 23, and by means of light pressing action.

What is claimed is:

1. A securing coupling for a corrugated pipe having a circumferential groove, said securing coupling comprising
   a tubular sleeve having a circumferential wall and an open end for receiving the corrugated pipe, said tubular sleeve comprising a sleeve section which is pivotable radially outward from said sleeve by means of an integral hinge connecting said sleeve section to said circumferential wall, a first locking tongue arranged in a first aperture in said circumferential wall, said first aperture being located in said sleeve section, said first locking tongue being resiliently connected to said sleeve section and having a first blocking projection which is engageable with said circumferential groove in said pipe, said first locking tongue being movable radially outward with resilience to release said blocking projection from said groove, and a second locking tongue arranged in a second aperture in said circumferential wall, said second aperture being located opposite from said first aperture, said second locking tongue being resiliently connected to said sleeve and having a second blocking projection which is engageable with said circumferential groove in said pipe, said second locking tongue having a lever arm which extends toward said open end of said sleeve oppositely from said blocking projection, said lever arm being movable radially inward to cause said second blocking projection to move radially outward with resilience to release said second blocking projection from said groove.

2. A securing coupling as in claim 1 wherein at least one of said first and second locking tongues is tapered so that it becomes narrower in a direction away from said blocking projection.

3. A securing coupling for a corrugated pipe having a circumferential groove, said securing coupling comprising a tubular sleeve having a circumferential wall and an open end for receiving the corrugated pipe, said tubular sleeve comprising a sleeve section which is pivotable radially outward from said sleeve by means of an integral hinge connecting said sleeve section to said circumferential wall, a locking unit arranged on said sleeve section, said locking unit comprising a first blocking projection which is engageable with said circumferential groove in said pipe, and a locking tongue arranged in an aperture in said circumferential wall, said aperture being located opposite from said first blocking projection, said locking tongue being resiliently connected to said sleeve and having a second blocking projection which is engageable with said circumferential groove in said pipe, said locking tongue having a lever arm which extends toward said open end of said sleeve oppositely from said blocking projection, said lever arm being movable radially inward to cause said blocking projection to move radially outward with resilience to release said second blocking projection from said groove.

4. A securing coupling as in claim 3 wherein said locking unit is arranged between two apertures in said sleeve section, said locking unit further comprising two securing elements which connect said first blocking projection to said sleeve section to limit radial movement of said blocking section.

5. A securing coupling as in claim 4 wherein at least one of said securing elements comprises an additional aperture.

6. A securing coupling as in claim 3 wherein said locking tongue is tapered so that it becomes narrower in a direction away from said blocking projection.

7. A securing coupling as in claim 3 wherein said sleeve section has a free end opposite from said hinge, said sleeve comprising a slot shaped recess which receives said free end.

8. A securing coupling as in claim 7 wherein said slot shaped recess comprises an abutting surface forming a first projection in said recess, said free end of said sleeve section comprising an abutting surface forming a second projection which engages said first projection to lock said free end in said recess.

9. A securing coupling for a corrugated pipe having a circumferential groove, said securing coupling comprising a tubular sleeve having a circumferential wall and an open end for receiving the corrugated pipe, at least two locking tongues arranged in respective apertures in said circumferential wall, each said locking tongue being resiliently connected to said circumferential wall and having a blocking projection which is engageable with said circumferential groove in said pipe, each said locking tongue being movable radially outward with resilience to release said blocking projection from said groove, each said locking tongue tapering so that it becomes narrower in a direction away from the respective said blocking projection wherein at least one of said locking tongues is connected to said circumferential wall by an arched connecting element which limits movement of said tongue in a radial direction.

10. A securing coupling as in claim 9 comprising three said locking tongues.

11. A securing coupling as in claim 9 comprising four said locking tongues.

12. A securing coupling as in claim 9 wherein at least one of said locking tongues has at least one aperture.

13. A securing coupling kit comprising a securing coupling for a corrugated pipe having a circumferential groove, said securing coupling comprising a tubular sleeve having a circumferential wall and an open end for receiving the corrugated pipe, and at least two locking tongues arranged in respective apertures in said circumferential wall, each said locking tongue being resiliently connected to said circumferential wall and having a blocking projection which is engageable with said circumferential groove in said pipe, each said locking tongue being movable radially outward with resilience to release said blocking projection from said groove, each said locking tongue tapering so that it becomes narrower in a direction away from the respective said blocking projection, and a dismantling tool which fits around the pipe and is slidable axially between the corrugated pipe and the securing coupling, said dismantling tool comprising two semi-shells which fit together to form a tubular tool assembly, at least one of said semi-shells comprising at least one locking tongue which can pivot radially inward to engage the corrugated pipe so that the corrugated pipe can be drawn out of the securing coupling.

14. A securing coupling kit as in claim 13 wherein said two semi-shells are connected by at least one hinge which permits said semi-shells to pivot together to form said tubular tool assembly.

* * * * *